July 7, 1931.  C. E. F. AHLM  1,813,376
TRANSMISSION GEARING
Filed April 4, 1925  2 Sheets-Sheet 2

Inventor
Charles E. F. Ahlm
By Bates, Macklin, Golrick & Teare
Attorneys

Patented July 7, 1931

1,813,376

UNITED STATES PATENT OFFICE

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE

TRANSMISSION GEARING

Application filed April 4, 1925. Serial No. 20,837.

This invention relates to transmission gearing for automobiles and the general object is to provide an efficient and simple form of gearing capable of transmitting an over-speed and an under-speed from a driving member, to a driven member adapted to operate as an auxiliary gearing for one already existing but which is incapable of delivering an adequate range of speeds for all driving conditions.

Auxiliary gearing for obtaining additional speeds have been found to operate advantageously adjacent the rear axle of the car, the casing for such gearing being adapted to be bolted directly to the differential housing. However, in this position the capabilities of gearing such as heretofore used, both as to strength and the number of speed changes have been limited, by reason of the requirement that gearing used in this position must not add materially to the unsprung weight of the car, and must be very compact.

Other objects, therefore, include the provision of an extremely compact gearing, capable of delivering a great amount of power at a plurality of speeds, and in which the gears are maintained permanently in mesh to avoid clashing of the gear teeth in changing from one speed to another.

A further object may be stated to include the provision of bearing retaining devices which will permit certain of the gears and bearings therefor to be assembled in complete sub-assemblies which may be easily handled as units and which, when the whole gearing is put together, will effectively prevent endwise movement of any of the rotating members.

Other objects and features of my invention will become apparent from the further description which relates to the accompanying drawings wherein I have illustrated the preferred form. The essential characteristics will be summarized in the claims.

Figure 1:
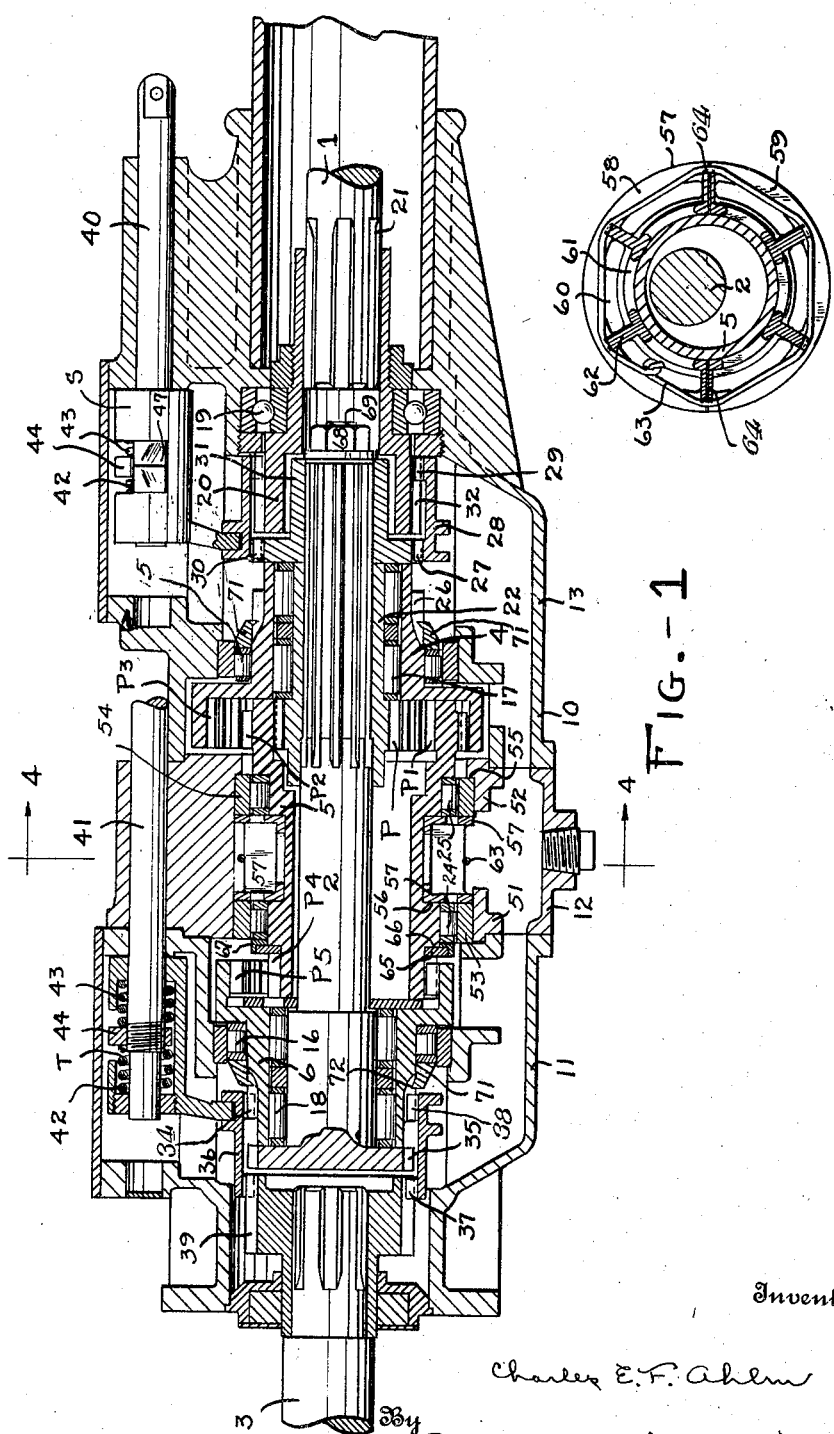
Figure 2:
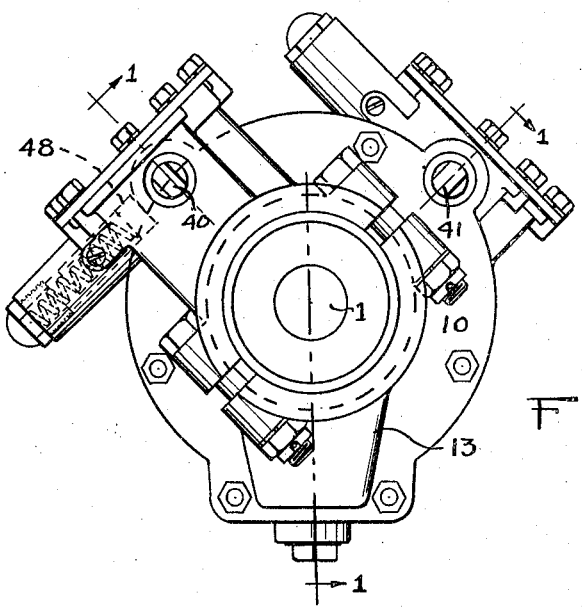
Figure 3:
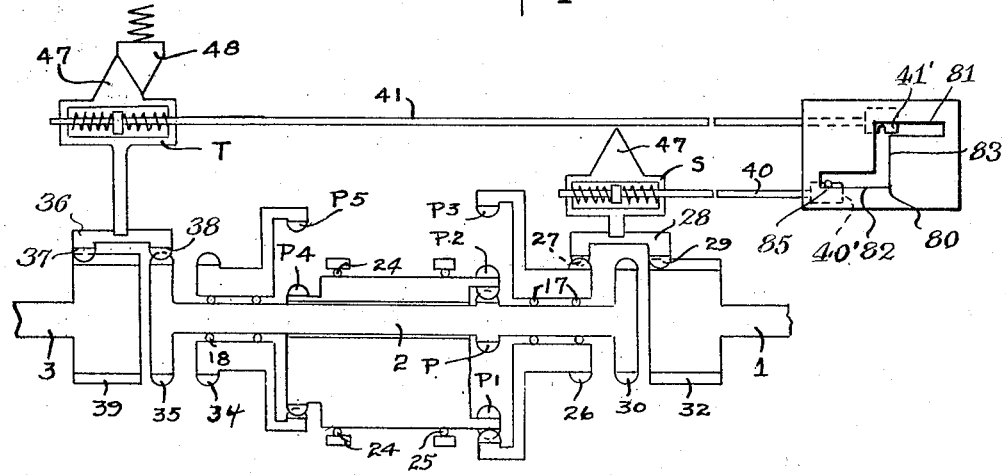

In the drawings Fig. 1 is a substantially central longitudinal section through my gearing; Fig. 2 is an end elevation of the gearing showing a preferred arrangement of clutch shifting mechanism; Fig. 3 is a diagram illustrating the essential elements of the gearing and a convenient means for controlling the clutch shifting means and maintaining the gears in their proper relation. Fig. 4 is a cross section through a preferred form of bearing spacer as indicated by the line 4—4 on Fig. 1.

Referring in detail to the drawings, a portion of a driving shaft is indicated at 1, an intermediate shaft at 2 and a driven shaft at 3. The section of the shaft 1 may be the rearward end of the propeller shaft of an automobile.

The casing for the gearing may comprise a substantially closed housing 10 shown as formed in three sections 11, 12 and 13 to facilitate assembly and casting. Supported on bearings 15 and 16 in the forward and rearward sections of the casing, I have shown internal gear members 4 and 6 and these gear members in turn support anti-friction bearings 17 and 18 for the intermediate shaft 2. The support for the driving shaft may include a roller bearing 19, the inner ring of which as shown is carried by a dental member 20 shown as splined to the shaft at 21.

The gearing of my transmission mechanism preferably comprises a pinion, designated P, and shown as having a tubular portion 22 splined to the intermediate shaft, the member 22 being directly supported by the bearing 17. The pinion P is shown as being permanently in mesh with internal teeth P—1 of a composite gear member 5 shown as surrounding the central portion of the intermediate shaft and as supported by eccentrically placed bearings 24 and 25 carried by the casing. This permanently offset position of the bearings 24 and 25 results in a fixed offset axis of rotation of the composite gear. The gear members 4 and 6 are provided with internal gear teeth P—3 and P—5, which by reason of the eccentric position of the composite gears, are permanently in mesh with gear teeth P—2 and P—4 of the composite gear.

The gears 4 and 6 are each arranged to be connected, by dental clutch devices, to one of the driving or driven shafts, and to be independently disconnected while the driving and driven shafts are connected directly to the intermediate shaft. The connection in each case is substantially the same in principle and is preferably accomplished by the use of compact, yet sturdy dental clutch arrangements capable of being very quickly and easily operated. A very similar clutch arrangement to that herein shown forms in part the subject matter of a separate application filed by me March 14th, 1925, Serial No. 15,480.

I have shown the gear 4 as provided with teeth 26 arranged to be slidably engaged by teeth 27 of a shifting dental clutch collar 28 which has also teeth 29 arranged to permanently engage teeth 32 carried by the member 20. The intermediate shaft 2 has also teeth 30 carried by a member 31 in position to be engaged by the teeth 27. The collar is moved by a shifting head S, which will be later described more in detail, to make the desired connections.

The clutching arrangement at the other end of the intermediate shaft comprises teeth 35 rigid on the shaft, a shifting collar 36 having teeth 37 and 38, the latter being capable when the collar is shifted as by a head T, of engaging either the teeth 35 or similar teeth 34 on the gear 6, the teeth 37 remaining in engagement with teeth 39 on the driven member 3.

The gearing embodiment which I have illustrated is capable of transmitting three different speeds including direct drive. I have found it convenient to use in this adaptation only three, namely, direct, high and the extreme low speed, the speed which I do not utilize when using the gearing as an auxiliary transmission being slightly under that of the driving member.

For the first speed, namely direct drive it is simply necessary to shift the collar 28 to the right to connect the member 20 with the member 31 on the intermediate shaft and to shift the clutch collar 36 to the left to connect the teeth 35 with the teeth 38, thus directly connecting the members 2 and 3.

The high or over-speed, is effected by shifting both the heads S and T to the left as shown diagrammatically in Fig. 3, keeping the relation just described with reference to the intermediate and driven members, while the teeth 32 and 26 are bridged across by the clutch collar 28. In this condition it will be seen that the teeth P3 are driven at the speed of the driving shaft; the composite gear is driven at an increased speed by reason of the gear P2 being smaller than P3, while the teeth P are driven by the teeth P1 of the composite gear at a still higher speed. In the proportions shown and assuming a driving speed of 600 R. P. M., this over-speed amounts to about 930 R. P. M.

The under-speed results from shifting both the heads S and T to the right as shown in Fig. 1, in which the driving and intermediate members are directly connected. The teeth P drive the composite gear as a small and large gear, or at a reduced speed, while the teeth P4 on the composite gear drive the teeth P5 at a still more reduced speed. In the proportions shown and with the same speed for the driving member, this reduction amounts to about 363 R. P. M.

The fourth speed of which the gearing is capable but which, in the specific construction shows I do not utilize amounts to a small decrease of speed and results from shifting the head S to the left and the head T to the right, driving the teeth P3 at the same speed as the driving member rotates, as before, resulting in an increased speed of the composite gear. The composite gear then drives the gear 6 at a decreased speed which may thus be directly transmitted to the driven member.

Shifting bars 40 and 41 may be used to operate the heads S and T, and I preferably use a mechanism which is shown and claimed in my prior application above referred to whereby a resilient connection is had between the shifting bars and the head to provide against the cooperating clutch members remaining in neutral position. This mechanism includes springs 42 and 43 carried in recesses in the heads S and T and bearing against nuts 44 rigid on the bars. The heads are provided with wedge pointed projections 47 which coact with spring plungers 48 having complementary wedge-shaped ends designed to cam against the intersecting surfaces of the point 47. Whenever by reason of the pull or push on one of the rods, the respective plunger is retracted until the points are aligned, the resilient connection will cause the overthrow of the head in question to cause a complete shift. For example if the bar 40 be pushed to the left, the spring 42 is first compressed and finally enough force is applied to the head to retract the plunger 48, and as it reaches its extreme withdrawn position, the compressed spring 42 will act to insure a complete throw, irrespective of whether or not the movement of the bar 40 is continued past this point.

At the right of Fig. 3, I have shown a convenient means whereby the proper positioning of the heads S and T may be effected. The forward ends of the bars 40 and 41 are provided with slotted heads 40' and 41' respectively. Positioned over these heads is a plate having a slot 80 therein, a longitudinally extending portion 81 of which is above the head 41' and a similar portion 82 over the head 40', these portions being connected by a transversally extending portion 83. This slot may guide the end of a shifting lever 85 shown as engaging the slotted head 40'. The position in which the parts are shown in Fig. 3 results in the over-speed drive. It will be seen that when the lever carries the head 40' to the right, the gearing will be connected for direct drive and that when the lever traverses the slot portion 83 and engages the slotted head 41' and shifts it to the extreme right, the gearing will be in position for reduced drive.

The primary purpose of the three part arrangement of the housing is to enable the parts to be quickly assembled in compact and non-shifting relation. The middle section 12 it will be seen is provided with bearing supporting members 51 and 52 which directly support the outer bearing rings or races 53 and 54 for the bearings 24 and 25. The bearing supporting member 52 is shouldered at 55 in order to properly retain the rings 54 against forward endwise shifting. My method of assembling the members may consist in first slipping the bearings 24 and 25 together with their outer rings over the rearward end of the eccentric gear, the latter ring abutting the shoulder 55. In order to prevent the removal of the rearmost bearing 24 over the teeth P—4, I provide retaining members comprising a split ring 65, the two halves of which are assembled in a groove 66 between the inner ends of the teeth P—4 and the adjacent enlarged bearing portion of the gear 5 and a solid ring 67 having an overhanging flange which has been previously placed over the bearing surface for the bearing 24 and which may now be slid rearwardly, the flange overlapping the outer peripheral surfaces of the split ring 65. The bearing 24 may now be slid rearwardly into its final position adjacent the rings 67. The means for holding both bearings in position is then applied which means I will now describe.

Between the bearings 24 and 25 and extending into a peripheral channel 56 in the eccentric gear member 5, I show a bearing spacer 57, the construction of which is best set out in Figs. 1 and 4. This member consists of a double flanged diametrically split circular casting having sections 58 and 59. In order that the member may be as light as is practicable, I have shown the member cored away at 60 and 61 and provided with webs 62 connecting the two end flanges. The casing may be split as shown, at 64, along the center of a pair of webs and the material removed in cutting may be replaced by a shim when the two parts are assembled on the member 5. A wire such as shown, at 63 may serve to retain the member 57 in place. The gear with its bearings may now be conveniently journalled as a sub-assembly ready to be slid into place in the central section of the housing 12.

The shaft 2 which has the clutch member 35 formed integrally therewith, as shown, is next slid into place through the gear 6 and the free end of the shaft is then thrust through the gear 5 to the position shown in Fig. 1. The splined member 22 which carries the gear P—3 is then slid over the forward end of the shaft 2, and the gear 4 and its bearings are then assembled over the tubular bearing portion of the member 22. It will be noted that the flanged clutch member 31 engages both the forward end of the member 22 and the tubular portion of the gear 4 so that when the clutch member 31 is secured in position by a nut 68 engaging a stud 69 carried by the end of the shaft 2, all of the gear members, the bearings therefor and the intermediate section of the housing become as a unit.

The manner in which I preferably retain the bearings 15 and 16 in place, is by means of collars or rings which it is desirable to fasten very securely to the gear members. I have found a satisfactory arrangement is to provide rings 71 having feather edges which are capable of being turned inwardly as shown, into kerfs 72 cut into idle portions of the clutch teeth adjacent the bearings. These bearing members 15 and 16 together with the retaining means just described may be applied to the gears either before or after the assembly of all the gears together preferably the former.

The assembly of the parts carried by the end sections 11 and 13 may be quite simply effected and will not be described in detail but it will be seen from the drawings that these assembled parts may now be put into place, the clutch collars 28 and 36 sliding into place over the ends of the assembled gear unit as shown, and the casing bolted together by flanges and bolts adjacent the lines of separation of the casing members in the usual manner.

The longitudinal dimension chosen for the bearing rings 53 and 54 and the separating member 57 may be such that the member 57 is pinched between the bearing rings by the application of the end sections 11 of the housing, an arcuate portion of which engages the end of the former bearing rings.

A principle of construction which makes my gearing unusually compact and easy to assemble is that of eliminating one or both of the usual separate bearing rings or races for the gear supporting roller bearings. It is to be noted that throughout my gearing, integral portions of the gear members themselves furnish bearing races for the rollers. For example, the bearings 15 and 16 and the composite gear supporting bearings 24 and 25 are provided with only outer bearing races interposed between the rollers and the casing. I have found that steel which is best suitable for the gears is also hard enough to provide a very satisfactory bearing surface, whereas separate rings are necessary where the bearings are to be supported by a member such as a housing member which may be most conveniently formed of cast metal.

Having thus described my invention, I claim:—

1. In combination, two shafts and an intermediate member substantially abutting the inner end of each shaft, a gear train consisting of hollow internal and external gears through at least one of which the member passes, and a clutch member for each shaft, each being arranged to connect the respective shafts directly to the intermediate member and directly to a respective element of the gear train.

2. In a gearing, two longitudinally separated shafts, connecting means therefor extending substantially from the inner end of one shaft to the inner end of the other, means to interrupt such connection, a hollow compound gear through which the connecting means passes, the hollow gear being in eccentric relation to at least one of the shafts, a plurality of gear members each having an internal gear connection with the compound gear, and means to establish at least two other driving connections between the shafts, one being through the compound gear and one of the gear members, another being through the compound gear and the other gear member.

3. In a gearing, a stationary casing, a pair of shafts supported thereby, an intermediate shaft, a compound hollow gear having a fixed bearing in the casing eccentric to at least one of the shafts and surrounding the intermediate shaft, two members each having an internal-external geared connection with the hollow gear, means for connecting the first named shafts directly through the intermediate shaft, means to connect them through the compound gear and one of the said members for a different speed and means to connect them through the other compound gear and the other of said members for a third speed.

4. In a gearing, a stationary casing, a pair of aligned shafts to be connected, connecting means comprising gears associated with each and in axial alignment therewith, a compound gear supported by the casing in fixed eccentric relation to the first mentioned gears and having a set of teeth at each end meshing with the respective first mentioned gears, and clutches operable to directly connect and disconnect each shaft from its respective first mentioned gear.

5. In a gearing, two shafts, a member intermediately of the shafts, a plurality of hollow gears each having either internal or external teeth, through which gears the member passes, the gears being at all times interconnected for rotation, teeth on one of the gears in permanent mesh with teeth on the member, and clutch means for connecting one of the first named shafts to the member and the other to one of the gears for one speed, and for connecting a different one of the first named shafts to the member, and the other to another of the gears for another speed.

6. In a gearing a shaft, external teeth rigid therewith, a compound gear having internal teeth meshing therewith, two gears each having an internal-external gear connection with the compound gear, a driving and a driven member and clutch means associated with each member for coupling the respective members either to the said shaft or to one of the gears.

7. In a gearing two shafts in fixed longitudinal relation, two hollow gears in surrounding and concentric relation to one of the shafts, a compound eccentrically mounted gear having sets of teeth in mesh with both hollow gears, means for transmitting power directly from one shaft to another, means for transmitting power from one shaft through the compound gear, one of the hollow gears and thence to the other shaft, and means for transmitting power through both hollow gears, the compound gear and thence to the other shaft.

8. In a gearing a shaft, a hollow gear in surrounding and concentric relation to the shaft, a compound gear in surrounding and eccentric relation to the shaft and having teeth meshing with the first mentioned gear, another gear in concentric relation to the shaft and having teeth meshing with teeth of the compound gear, a driving member and a driven member in fixed longitudinal relation to each other and means to establish a driving connection therebetween through the shaft only, or through the gears.

9. In a gearing two shafts, means including a rotatable member for connecting the shafts directly together, two hollow gears in surrounding relation to the member, and a compound hollow gear having sets of teeth in mesh with the first mentioned gears respectively, the compound gear being in surrounding and eccentric relation to the member, selective clutch means for connecting one shaft to one of the first mentioned hollow gears and selective clutch means to connect the other shaft to the other of the first mentioned hollow gears.

10. In a gearing of the class described, a driving and driven shaft, axially aligned internal gears, each capable of being connected with a respective shaft, an eccentrically mounted composite internal-external gear having teeth meshing with both of said internal gears, an intermediate shaft interposed between said driving and driven shafts and in geared relation to the composite gear, and dental clutch means cooperating with the shafts and gears for selectively coupling the first named shafts to the intermediate shaft for direct drive to the respective gears, for a second speed and for connecting one of the first-named shafts to the intermediate shaft and the other to one of the said internal gears for a third speed.

11. In combination a driving and a driven member, internal gear members adapted to be connected to and disconnected from said driving and driven members, a composite internal-external gear permanently in mesh with said internal gears and mounted to rotate on a fixed axis and an intermediate shaft having a geared connection with said composite gear and capable of being connected directly with either the driving or driven members whereby the driven member may be rotated synchronously with the driving member and at a higher or lower speed.

12. In a gearing, axially aligned shafts comprising a driving, a driven and an intermediate shaft, gears coaxial with the shafts and each adapted to be directly connected with one of said driving or driven shafts to rotate in unison therewith, an eccentrically mounted gear member in mesh with both gears and geared to the intermediate shaft, and means for connecting one of the coaxial gears to its respective shaft, leaving the other disconnected for imparting either increased or decreased speed to the driven member through the eccentrically mounted gear depending on which is connected, said connecting means being also capable of disconnecting both gears and connecting the three named shafts together for direct drive.

13. In combination, in a gearing a plurality of axially aligned shafts comprising a driving, a driven and an intermediate shaft, gears mounted independently of said shafts, each arranged to be connected with one of said driving or driven shafts to rotate in unison therewith, an eccentrically mounted gear member in mesh with both gears, and geared to the intermediate shaft, means for connecting the gears to their respective shafts for imparting increased or decreased speed as desired to the driven member, said means being also operable to disconnect both gears and to connect the three named shafts together for direct drive, the gears all running idly at a less speed than the shafts when the shafts are in direct connection.

14. A gearing of the class described comprising driving, intermediate and driven members axially aligned and capable of being connected together for direct drive, internal gears each capable of being independently connected to one of said driving or driven members, a composite external gear having teeth permanently in mesh with both internal gears and a geared connection between said composite gear and the intermediate shaft whereby when an internal gear is connected to its respective shaft, the driven member is rotated at a higher speed than the driving member, and when the other gear member is connected the condition is reversed.

15. The combination in a gearing, a driving and a driven member, an intermediate member in axial alignment with the driving and driven member, dental clutching means carried on either end of said intermediate member, cooperating clutching means slidable with reference to both the driving and driven members and adapted to be operated to clutch all three members together for direct drive, internal gears mounted coaxially with said intermediate member, a composite gear mounted eccentrically to said intermediate member, and in mesh with both of said gears, a geared connection between said composite gears and said intermediate members and means for operating the clutching members whereby the driving member and one of the gears may be connected to drive the intermediate member through the agency of the composite gears at a higher speed than the driving member rotates at which time the intermediate member and driven member are positively connected together, said operating means being also capable of connecting the driven member and the other composite gear for imparting a reduced speed to the driven member.

16. In combination in a gearing, a driving and a driven member, gear members adapted to be connected to and disconnected from said driving and driven members, a composite gear eccentrically mounted and in mesh with said first mentioned gear members, an intermediate shaft, a gear rigid with the shaft and meshing with teeth on said composite gear, said intermediate shaft having means at its ends for connecting this shaft directly with both the driving or driven members whereby the driven member may be rotated synchronously with the driving member and means for connecting the driving and driven shafts with respective first mentioned gear members.

17. In combination with a casing, a driving and a driven member, internal gear members adapted to be connected to and disconnected from said driving and driven members, a composite internal-external gear in mesh with said internal gears and mounted on rolling bearings supported by the casing, and an intermediate shaft in axial alignment with said driving and driven members, and having a geared connection with said composite gear and capable of being connected directly with both or either of the driving or driven member, whereby the driven member may be rotated synchronously with the driving member or at a higher or lower speed.

18. In a gearing, a driving, a driven and an intermediate member, internal gears coaxial with at least one of the shafts and each adapted to be directly connected with one of said shafts to rotate in unison therewith, an eccentrically mounted gear member in mesh with both gears, a gear on the last named member in mesh with a gear on the intermediate member, a common control, means for connecting the two shafts directly to the intermediate shaft for direct drive and for connecting each shaft to a respective internal gear for other speeds and means for preventing one shaft from being connected to its respective internal gear after the other shaft has been connected to its gear, until the two shafts have been reconnected to the intermediate member.

19. In combination, in a gearing a plurality of axially aligned shafts comprising a driving, a driven and an intermediate shaft, internal gears mounted independently of said shafts, each arranged to be connected with one of said driving or driven shafts, an eccentrically mounted internal-external gear member in mesh with both internal gears, and geared to the intermediate shaft, the gearing operating when one of the internal gears is connected to its shaft to transmit an overspeed to the driven member, and when the other is connected, to transmit an underspeed.

20. In a gearing in combination, a casing comprising end housing members and an intermediate housing member, a circular recess on said intermediate member, a pair of annular bearings each comprising outer race members and a series of rollers, said races engaging said recess, a gear member having gear teeth at either end thereof and a peripheral groove in its intermediate portion, said rollers engaging peripheral surfaces adjacent said groove, a separable spacing member having flanges extending outwardly adjacent the ends of the bearings and retained against endwise shifting by said groove, gears carried by said end housing members adapted to mesh with the teeth of said gear member, means including shafts capable of being connected to said gears for rotating one of the shafts at a plurality of speeds, and means including a member carried by one of the end housing members arranged to engage one of said race members whereby when all the housing members are assembled, the bearing and said gear member are prevented from endwise shifting.

21. In a gearing in combination, a casing comprising a plurality of housing members, one having inner peripheral surfaces capable of supporting annular bearings, a gearing including an internal gear adapted to be connected to one of a pair of rotatable members, a composite gear having teeth in mesh with said internal gear adapted to drivingly connect with the other rotatable member, longitudinally separated roller bearings exteriorly of the opposite gear engaging said peripheral surfaces, a separate spacing member having flanges adjacent both of said bearings and engaging the composite gear when assembled to prevent longitudinal shifting between the said gear and the bearings, and means including surfaces on each of the housing members transverse to the axis of the gears, whereby when the housing members are assembled the bearings and composite gear are retained against relative longitudinal shifting.

22. In a gearing a housing comprising end members and an intermediate housing member, a shoulder in a recess in the latter, roller bearing members having the usual outer races positioned in the recess, a gear member having gear teeth at either end thereof supported by the bearing members, and bearing spacing and retaining means including a separable member retained against endwise shifting relative to the gear member when the parts of the separable member are assembled, whereby the bearings may be held in spaced relation on the gear member, and whereby the gear member and bearings may be slid into place as a unit, one of the bearing races engaging the shoulder, the other being engaged by a portion of the adjacent end housing member when the housing members are assembled, and gears carried by the end housing members cooperating with said gear member adapted to transmit a plurality of speeds to a driven member.

23. In a gearing of the class described a pair of internal gear members, a composite gear having teeth in engagement with both gears, a shaft extending through both of said internal gear members, flanged clutching members carried at the ends of the shaft and arranged, when assembled rigidly on the shaft, to prevent the removal of said internal gear members, eccentric bearings surrounding the composite gear member, a channel in the exterior of said composite gear member, between the bearings and a separable flanged member extending into the channel, the flanges being arranged to hold the bearings in separated relation, a housing member arranged to support the bearings and means carried by the housing engaging a portion of one of the bearings for preventing the endwise shifting of the gears and bearings in one direction, said gears, shaft, bearings and intermediate housing member forming a complete sub-assembly, and end housing members capable of being secured to said first named housing member to form a casing for the gears, one of said housing members engaging a portion of the other bearing for preventing endwise shifting in the other direction.

24. In a gearing of the class described, a pair of internal gear members, a composite gear member having teeth in engagement with both gears, a shaft extending through both of said internal gear members having a geared connection with the composite gear, flanged members carried thereby arranged to prevent the endwise relative movement of said internal gear members, spaced annular bearings adapted to be supported on an axis eccentric to the shaft and surrounding the composite gear member, means for preventing longitudinal movement of the bearings toward each other, a housing member surrounding the bearings and separate housing members arranged to be secured to the said first named housing member to form a casing for the gears, one of said housing members having a portion thereof arranged to retain the gears against longitudinal movement within the casing.

25. In a gearing a gear member, a shoulder on said member, a roller bearing adjacent the shoulder surrounding the gear member and prevented from longitudinal shifting in one direction by the shoulder, a peripheral channel adjacent the bearing, a member seated in the channel to prevent the longitudinal shifting of the bearing in the other direction, another bearing surrounding the gear member arranged to be prevented from longitudinal, shifting in one direction by said separable member, a peripheral groove in said gear member, a separable annular member in said groove and an annular member having an overhanging flange, said annular member extending adjacent said second named bearing to hold it against longitudinal shifting, the flange thereof overlying the separable member to hold it against separation, the separable member in turn holding the flanged annular member against removal from the gear member.

26. In a gearing in combination a casing comprising end housing members and an intermediate housing member, bearing supporting members carried by said intermediate housing member, a gearing including axially aligned internal gears adapted to be connected to driving and driven members, each of said gears having a bearing in its respective end housing member, a composite gear in mesh with said gears, bearings for the composite gear supported in said intermediate housing member, a separable annular member seated in a peripheral channel in said composite gear member for separating said bearings, said gear members being held in position by the application of the end housing members to said intermediate housing member.

27. In a gearing of the class described a driving member and a driven member, internal gears capable of being connected with one of the members, a composite eccentrically mounted internal-external gear having teeth meshing with either of said internal gears and having a driving connection with one of said members, roller bearing members for supporting said composite gear, a separable bearing spacing member surrounding the composite gear between the bearings, means including a second separable member and a peripheral groove in said composite gear member carrying said last named separable member for holding both of said bearing members in place on the gear and means for retaining the last named separable member in place.

In testimony whereof, I hereunto affix my signature.

CHARLES E. F. AHLM.